Patented Jan. 1, 1935

1,986,567

UNITED STATES PATENT OFFICE 1,986,567

PROCESS OF RECOVERING BERYLLIUM OXIDE

Karl A. Ferkel and Abram I. Ellis, Los Angeles, Calif., assignors to The Beryllium Corporation, New York, N. Y., a corporation of Delaware No Drawing. Application January 5, 1931, Serial No. 506,743

4 Claims. (Cl. 23—18)

The object of this invention is to provide an advantageous process for the manufacture of beryllium oxide from siliceous beryllium ores on an industrial scale.

The invention is particularly intended for treatment of siliceous ores containing beryllium together with aluminum and also heavy metals such as iron or manganese. An important object of the invention is to provide a simple and inexpensive means of separating the beryllium from the aluminum and from the heavy metals.

This invention discloses an improvement over existing processes in that it requires the expenditure of but a minimum amount of time and energy, and the materials used are converted into salable by-products or recovered and introduced back into the cycle of operation. This process has the further advantage that every step is standard chemical practice and requires no costly or specially built equipment.

According to a preferred embodiment of the invention, the siliceous beryllium bearing mineral, such as beryl, is powdered, thoroughly mixed with an equal part by weight of soda ash, and fused to a liquid in a suitable tank furnace, such as used in the manufacture of glass, or in any other suitable furnace. The fused mass is cooled, preferably by pouring on a cool surface so as to cause it to be broken up due to the sudden cooling, and is finely powdered and leached with water to remove the sodium silicate formed by the fusion with soda ash, which sodium silicate may be recovered and sold to the trade as silicate of soda or water glass. The insoluble silicates formed by such fusion, consisting principally or largely of aluminum sodium silicate and beryllium sodium silicate, and other insoluble compounds such as heavy metal oxides, are mixed with acid such as sulphuric acid (preferably concentrated $H_2SO_4$) to form a thin paste, using a suitable excess of acid over the amount theoretically required to convert the beryllium and aluminum to the form of sulphates or salts of the acid used. If sulphuric acid is used, the mixture is then heated until the evolution of white fumes of sulphur trioxide occurs, which treatment dehydrates the silica, renders it insoluble, and converts the compounds of aluminum and beryllium to water soluble sulphates. The mass is then thoroughly leached with water or aqueous solvent, in sufficient amount to dissolve substantially all the aluminum and beryllium sulphates present, and the solution is decanted or filtered from the insoluble silica and other insoluble compounds which may be present. In case soluble salts of heavy metals are also formed by the addition of acid, these will also be contained in this aqueous solution, but will be subsequently separated, as hereinafter described.

In this manner, a large proportion, for example about 90% of the beryllium content of the ore may be extracted. More could be extracted by successive leachings but such procedure is not desirable, if the purity of the product is to be considered and is, furthermore, too costly for economical operation. The water extraction of the sulphates is treated with a strong solution of caustic soda, in order to convert the beryllium and aluminum from the sulphates to sodium berylate and sodium aluminate, which are soluble in water. A suitable excess of the caustic soda is then added and it is well to introduce a suitable oxidizing agent, preferably hydrogen peroxide, to convert any heavy metals which may be present to the form of their insoluble hydroxides or oxides.

The resulting sediment, including any such insoluble oxides of heavy metals, is filtered off and the solution is diluted by addition of water thereto and is heated, preferably to boiling temperature, so as to break up the sodium berylate by hydrolysis, precipitating it as beryllium hydroxide and leaving the sodium aluminate in solution. The resulting pure beryllium hydroxide is filtered, dried and calcined in a suitable furnace to the oxide of beryllium.

The solution remaining after separation of the precipitated beryllium hydroxide, containing sodium aluminate and sodium sulphate, may then be concentrated, for example by evaporation, or may be treated by any suitable or well known methods for the recovery therefrom of aluminum hydroxide, alum, or other valuable by-product.

The caustic liquid remaining after the aluminum has been recovered therefrom and after the aluminum content thereof has been suitably reduced by the above mentioned treatment, may be used over again for treatment of further quantities of beryllium and aluminum sulphates.

It will be understood that the above disclosure of the process is not intended as limiting the invention to the details given. Numerous beryllium bearing siliceous minerals have been found and classified and it is obvious that each mineral will require individual consideration so that it may be treated most economically. Another factor to be considered is the geographic and economic conditions at the plant location.

For example, under certain economic conditions, it might be advantageous to use hydrochloric acid instead of sulphuric acid to dehydrate the silica. If such be the case, then it is necessary to evaporate the mass to complete dryness in order to dehydrate the silica and render it insoluble before leaching out the chlorides of beryllium and aluminum. The solution containing such chlorides may then be treated in substantially the same manner as described above for the sulphates, to recover the beryllium oxide therefrom.

Also, instead of fusing the beryllium bearing mineral with soda ash, other fluxes or agents such as potassium carbonate, sodium hydroxide, sodium chloride, calcium oxide or mixtures of various compounds may be used.

Many beryllium bearing silicates may be treated to advantage without the caustic fusion procedure by mixing the finely ground mineral with carbon and subjecting the mixture to the continued action of heat. The temperature, which must be sufficient to produce a white heat, and the length of time of the heating, is dependent upon the kind of mineral under treatment. In general, the higher the temperature the shorter the time required to obtain the desired reaction. In practice it is not usually desirable to convert the metals present completely into the true form of carbides, such as silicon carbide, aluminum carbide or beryllium carbide but merely to decompose the beryllium silicate sufficiently so that further treatment with acid will put the aluminum beryllium into solution.

For example, beryl, a siliceous mineral containing beryllium, was finely ground and thoroughly mixed with one and one-half times its weight of finely ground coke. The mixture was heated in an electric furnace for five hours at a temperature of approximately 1400° C. When the mass was cool it was pulverized and treated with boiling sulphuric acid. The resulting solution which contained the sulphates of beryllium and aluminum and some silica, was decanted from the insoluble materials and evaporated until white fumes of sulphur trioxide occurred to dehydrate the silica. The mass was then leached with dilute sulphuric acid to dissolve the beryllium and aluminum and the insoluble silica filtered off. The solution was then made caustic and treated to recover the beryllium oxide as previously described.

In other cases, it has been found that a small percentage of carbon mixed with the beryllium bearing mineral and soda ash fusion is decidedly advantageous.

The invention may be considered as consisting not only in a complete process, such as above described, for the recovery of beryllium oxide from its ores, but also in the above described method of obtaining beryllium oxide, substantially free from aluminum compounds, from a solution containing soluble compounds of beryllium and aluminum, regardless of the method by which such compounds themselves are obtained from the ore.

It is because of the possible variations in the process which are suggested or dictated by the type of mineral used that we do not limit ourselves to the details set forth in the above specifications, but claim and desire to secure by Letters Patent of the United States, the following claims.

1. The process of recovering beryllium oxide from siliceous ores containing beryllium and aluminum together with a heavy metal, which comprises treating the ore to convert the beryllium and aluminum into acid soluble compounds, adding acid to form soluble beryllium and aluminum salts of such acid, evaporating to dehydrate and render insoluble the silica present, leaching with water to extract the soluble salts including any soluble compound of said heavy metal present, adding caustic soda to excess to convert the beryllium and aluminum salts to sodium berylate and sodium aluminate and to convert any heavy metal present to its insoluble oxide or hydroxide, separating from the solution insoluble material including any such insoluble heavy metal oxide or hydroxide, adding water to the solution and heating the same to cause precipitation of beryllium hydroxide, separating the precipitate and converting the same to beryllium oxide.

2. The process of recovering beryllium oxide from siliceous ores containing beryllium and aluminum which comprises fusing the ore with soda ash in approximately equal parts by weight, cooling the fused mass to solidify the same, reducing the solidified material to powdered condition, leaching with water to extract sodium silicate formed by said fusion, adding sulphuric acid in an excess over the amount theoretically required to combine with the beryllium and aluminum present, evaporating the mixture sufficiently to render the silica insoluble, leaching with water to extract soluble beryllium and aluminum sulphates, treating the solution with caustic soda in excess, removing material precipitated by the caustic soda treatment, diluting the solution and heating the same to boiling to cause precipitation of beryllium hydroxide, separating the precipitated beryllium hydroxide, and heating the same to convert it to beryllium oxide.

3. The process of recovering beryllium oxide from siliceous ores containing beryllium and aluminum together with a heavy metal, which comprises fusing the ore with a flux to convert the beryllium and aluminum into acid soluble compounds, adding acid to form soluble beryllium and aluminum salts of such acid, evaporating to dehydrate and render insoluble the silica present, leaching with water to extract soluble salts including soluble salt of said heavy metal also formed by said fusion and acid treatment, adding an excess of caustic soda and an oxidizing agent to convert the beryllium and aluminum salts to sodium berylate and sodium aluminate in solution and to convert said heavy metal salt to an insoluble oxide or hydroxide, separating from the solution insoluble material including such insoluble heavy metal oxide or hydroxide, adding water to the solution and heating the same to a sufficient temperature to cause precipitation of beryllium hydroxide, separating the precipitated beryllium hydroxide and converting the same to the oxide.

4. The process of recovering beryllium oxide from siliceous ores containing beryllium and aluminum together with a heavy metal, which comprises fusing the ore with a flux consisting of an alkali or alkaline earth metal compound to convert the beryllium and aluminum into acid soluble compounds, adding sulphuric acid to form soluble sulphates of beryllium and aluminum and also of said heavy metal, evaporating the mixture to dehydrate and render insoluble the silica present, leaching with water to extract said soluble sulphates, adding excess of caustic soda and an oxidizing agent to the resulting solution to convert beryllium and aluminum sulphates to sodium berylate and sodium aluminate in solution and to convert the sulphate of said heavy metal to an insoluble oxide or hydroxide thereof, separating from the solution insoluble material including said insoluble oxide or hydroxide, adding water to the solution and heating the same to cause precipitation of beryllium hydroxide, separating the precipitated beryllium hydroxide and converting the same to the oxide.

KARL A. FERKEL.
ABRAM I. ELLIS.